United States Patent
Maxein et al.

[11] Patent Number: 5,847,068
[45] Date of Patent: Dec. 8, 1998

[54] CHOLESTERIC COPOLYISOCYANATES

[75] Inventors: Georg Maxein, Neuwied, Germany; Bruce M. Novak, Amherst, Mass.; Rudolf Zentel, Nierstein; Harald Keller, Ludwigshafen, both of Germany

[73] Assignee: BASF Aktiengesellschaft, Ludwigshafen, Germany

[21] Appl. No.: 834,745

[22] Filed: Apr. 3, 1997

[51] Int. Cl.⁶ ..................................... C08G 18/71
[52] U.S. Cl. .................. 528/69; 528/44; 528/56; 528/73; 528/75; 525/452
[58] Field of Search ................. 528/44, 56, 69, 528/73, 75; 525/452

[56] References Cited

U.S. PATENT DOCUMENTS 4,232,951  11/1980  Aharoni et al. ................. 350/350

*Primary Examiner*—Rachel Gorr
*Attorney, Agent, or Firm*—Oblon, Spivak, McClelland, Maier & Neustadt, P.C.

[57] ABSTRACT

Cholesteric copolyisocyanates with repeating units of the formulae:

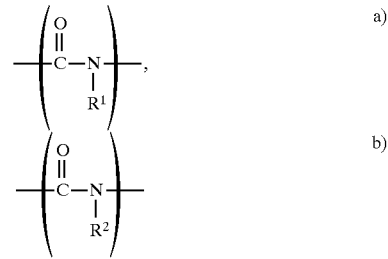

and, where appropriate, of the formula

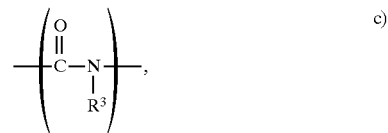

where
$R^1$ is a chiral aliphatic or aromatic radical,
$R^2$ is a crosslinkable radical, and
$R^3$ is an achiral radical,
and polymers obtainable by crosslinking the copolyisocyanates according to the invention with a polymerizable solvent, and pigments comprising the polymers according to the invention, are described.

23 Claims, No Drawings

CHOLESTERIC COPOLYISOCYANATES

BACKGROUND OF THE INVENTION

1. Field of the Invention

The invention relates to cholesteric copolyisocyanates.

2. Description of the Background

Heating of substances with shape anisotropy may result in liquid crystalline phases, called mesophases. The individual phases differ by the spatial arrangement of the molecular centers on the one hand and by the molecular arrangement in respect of the long axes on the other hand (G. W. Gray, P. A. Winsor, Liquid Crystals and Plastic Crystals, Ellis Horwood Limited, Chichester 1974). The nematic liquid crystalline phase has parallel orientation of the long axes of the molecules (one-dimensional order state). Provided that the molecules forming the nematic phase are chiral, the result is called a chiral nematic (cholesteric) phase in which the long axes of the molecules form a helical superstructure perpendicular thereto (H. Baessler, Festkörperprobleme XI, 1971). The chiral moiety may either be present in the liquid crystalline molecule itself or be added as doping substance to the nematic phase, inducing the chiral nematic phase. This phenomenon was first investigated on cholesterol derivatives (for example H. Baessler, M. M. Labes, *J. Chem. Phys.* 52, 631 (1970).

The chiral nematic phase has particular optical properties: a high optical rotation and a pronounced circular dichroism which arises due to selective reflection of circularly polarized light within the chiral nematic layer. If the pitch of the helical superstructure corresponds to the wavelength of visible light, what is called a Grandjean texture is formed. The colors which are apparently different depending on the angle of view depend on the pitch of the helical superstructure, which in turn depends on the twisting ability of the chiral component. In this connection it is possible to alter the pitch, and thus the wavelength range of the selectively reflected light, of a chiral nematic layer in particular by changing the concentration of a chiral doping substance. Chiral nematic systems of this type have interesting possibilities for practical applications.

It is known that polyisocyanates in concentrated solutions have liquid crystalline properties (lyotropic liquid crystals). The basic requirement for their liquid crystalline properties is the rigid polymer backbone in conjunction with flexible side chains, the former determining the rod shape of the molecule.

The flexible side chains increase the solubility of the polymer as far as the relatively high critical concentrations (about 30 to 60% by weight) necessary for forming a lyotropic liquid crystalline phase.

In the case of the known homopolyisocyanates, the chain length range which can be employed for n-alkyl substituents has narrow limits because substituents which are too short ($<C_4$) confer inadequate solubility, and substituents which are too long ($>C_{12}$) may lead to side-chain crystallization.

Polymerization of chiral in place of achiral isocyanates changes the nematic into a cholesteric phase. Cholesteric polyisocyanates advantageously have very high optical rotations even with a relatively low chiral monomer incorporation ratio.

Sato, T. et al. describe in Macromolecules, 26 (1993), 4551–4559 the cholesteric homopoly((R)-2,6-dimethylheptyl isocyanate) and the nematic poly(n-hexyl isocyanate), which is doped with a chiral compound in order to achieve a cholesteric effect.

A considerable problem in the use of cholesteric polyisocyanates is the fixing of the cholesteric phase.

Kozakiewicz, J. J. reports in Polymer Pigments, 26/1 (1985), 114–115 that an attempt to fix the lyotropic cholesteric phase of poly(hexyl isocyanates) in styrene as solvent by polymerization of the styrene is successful only on a very small scale. With larger batches, inhomogeneity of the two polymers polystyrene and polyisocyanate always arises during the polymerization.

SUMMARY OF THE INVENTION

It is an object of the present invention to provide cholesteric polyisocyanates whose cholesteric phase can be permanently fixed.

DETAILED DESCRIPTION OF THE PREFERRED EMBODIMENTS

We have found that this object is achieved by cholesteric copolyisocyanates with repeating units of the formulae:

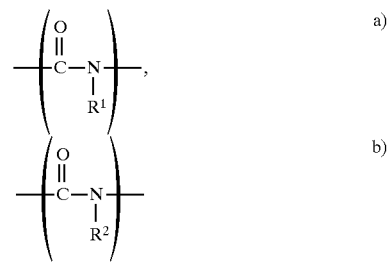

and, where appropriate, of the formula

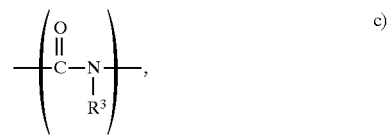

where
  $R^1$ is a chiral aliphatic or aromatic radical,
  $R^2$ is a crosslinkable radical, and
  $R^3$ is an achiral radical.

Unless stated otherwise, "alkyl", here means (also in meanings such as alkoxy, dialkyl, alkylthio etc.) a branched or unbranched $C_1$–$C_{12}$-alkyl, preferably $C_3$–$C_{12}$-, particularly preferably $C_4$–$C_{10}$-, especially $C_6$–$C_{10}$-alkyl.

$R^1$ is preferably selected from (chiral) branched or unbranched alkyl, alkoxyalkyl, alkylthioalkyl, cycloalkyl, alkylphenyl or $C_3$–$C_9$-epoxyalkyl radicals or radicals from esters of $C_1$–$C_6$-fatty acids with $C_1$–$C_6$-alkanols or $C_3$–$C_9$-dialkyl ketones. The ester residue may be bonded to the nitrogen atom either via the fatty acid moiety or via the alkanol residue. The radical $R^1$ can have 1, 2 or 3 substituents which are identical or different and are selected from alkoxy groups, di-$C_1$–$C_4$-alkylamino groups, CN, halogen atoms or $C_1$–$C_4$-alkylthio groups.

$R^1$ is preferably selected from alkyl, alkoxyalkyl, radicals from esters of $C_1$–$C_6$-fatty acids with $C_1$–$C_6$-alkanols, $C_3$–$C_9$-dialkyl ketones and epoxidized $C_3$–$C_9$-epoxyalkyl radicals, it being possible for $R^1$ to be substituted by 1 or 2 radicals which are identical or different and are selected from alkoxy, halogen, CN or $CF_3$. Preferred substituents for branched or unbranched alkyl or alkoxy radicals are selected from alkoxy groups, halogen atoms or CN; for esters of $C_1$–$C_6$-fatty acids with $C_1$–$C_6$-alkanols from alkoxy groups, halogen atoms, CN or $CF_3$ and for $C_3$–$C_9$-dialkyl ketones from alkoxy groups, halogen atoms or CN.

The main chain of the radical $R^1$ has, in particular, a length of from 3 to 12, in particular 6 to 10, preferably 6 to 8, members (carbon, oxygen and/or sulfur atoms). Particularly preferred radicals $R^1$ are selected from

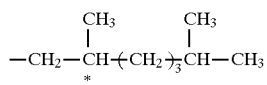

2,6-dimethylheptyl

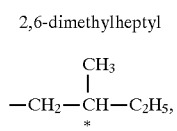

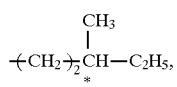

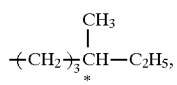

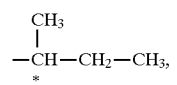

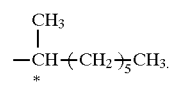

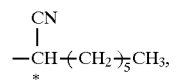

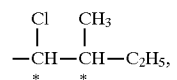

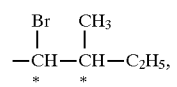

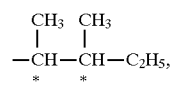

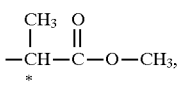

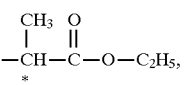

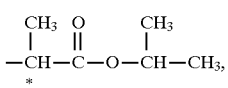

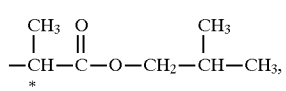

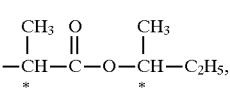

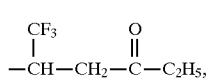

-continued

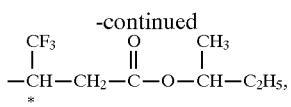

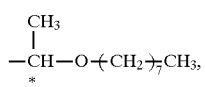

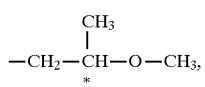

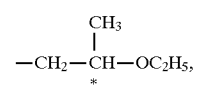

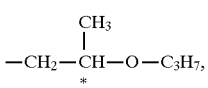

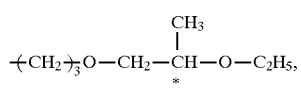

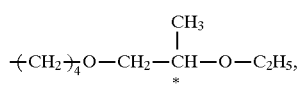

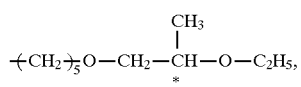

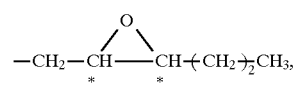

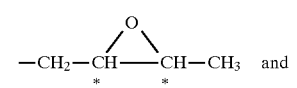 and

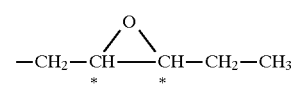

Component a) in the copolyisocyanates according to the invention is very particularly preferably derived from 2,6-dimethylheptyl isocyanate.

The radical $R^2$ in the copolyisocyanates according to the invention is preferably selected from $C_3$–$C_{11}$-alkenyl radicals, $C_4$–$C_{11}$-vinyl ether residues (=vinyl $C_2$–$C_9$-alkyl ethers), ethylenically unsaturated $C_3$–$C_{11}$-carboxylic acid residues and esters of ethylenically unsaturated $C_3$–$C_6$-monocarboxylic acids with $C_2$–$C_6$-alkanols, in which case the bonding to the nitrogen atom takes place via the alkanol residue of the ester. The radical is particularly preferably selected from methyl acrylate, ethyl acrylate, propyl acrylate, n-butyl acrylate, isobutyl acrylate, 2-ethylhexyl acrylate, methyl methacrylate, ethyl methacrylate, propyl methacrylate, n-butyl methacrylate, isobutyl methacrylate, 2-ethylhexyl methacrylate, in particular from ethyl acrylate or ethyl methacrylate.

The radical $R^3$ preferably has the same meanings as the radical $R^1$. However, it is achiral, ie. it has no center of chirality or is in the form of a racemic mixture.

The main chain of the radical $R^3$ particularly preferably has a length of from 4 to 12, in particular 6 to 10, preferably 6 to 8, members (carbon, oxygen and/or sulfur atoms). Component c) of the copolyisocyanates according to the invention is very particularly preferably derived from n-hexyl isocyanate, n-heptyl isocyanate or n-octyl isocyanate.

Components a), b) and c) are preferably present in the a:b:c ratio of molar amounts of about 1–20:1–20:50–98, in particular about 5–15:5–15:65–90, particularly preferably about 15:10:75.

Units (a), (b) and (c) can be randomly distributed in the copolyisocyanates according to the invention.

The copolyisocyanates according to the invention are preferably obtainable by polymerizing components a), b) and, where appropriate, c) with a suitable catalyst, preferably a catalyst of the formula $CpTiCl_2OCH_2CF_3$, $CpTiCl_2CH_3$ or, in particular, $CpTiCl_2N(CH_3)_2$, where Cp is $\eta^5$-cyclopentadienyl.

The copolyisocyanates according to the invention can be prepared in conventional apparatus, for example in stirred containers which are not transparent to UV light. Preferably one component a), b) and, where appropriate, c) is introduced with exclusion of $H_2O$ and mixed. The catalyst is then added.

The reaction time may vary within a wide range. It is generally from 1 hour to 5 days, in particular 10 hours to 3 days, depending on the required molecular weight of the polymer.

The reaction is, as a rule, carried out at room temperature; however, it can also be carried out at reduced or elevated temperature, for example in the range from 10° to 50° C., it also being possible to change the temperature stepwise.

The final product of the reaction can be isolated in a conventional way, for example by reprecipitation several times using methanol/chloroform.

Living polymerization with titanium catalysts advantageously makes it possible to adjust the required molecular weight accurately with extremely little inhomogeneity. This considerably improves the quality of the color of the lyotropic cholesteric phase. The copolyisocyanates according to the invention are resistant to temperatures up to about 180° C., and are thus suitable for use in surface coatings and paints.

The present invention furthermore relates to polymers obtainable by i) dissolving copolyisocyanates according to the invention in a polymerizable solvent, and ii) crosslinking the copolyisocyanates and solvent together.

Preferred polymerizable solvents are esters of $\alpha,\beta$-unsaturated mono- or dicarboxylic acids, in particular $C_3$–$C_6$-mono- or dicarboxylic acids, with $C_1$–$C_{12}$-alkanols, $C_2$–$C_{12}$-alkanediols or their $C_1$–$C_6$-alkyl ethers and phenyl ethers, for example the acrylates and methacrylates mentioned above in connection with $R^2$, hydroxyethyl or hydroxypropyl acrylate or methacrylate, and 2-ethoxyethyl acrylate or methacrylate;

vinyl $C_1$–$C_{12}$-alkyl ethers such as vinyl ethyl, vinyl hexyl or vinyl octyl ether;

vinyl esters of $C_1$–$C_{12}$-carboxylic acids such as vinyl acetate, vinyl propionate, vinyl laurate;

$C_3$–$C_9$-epoxides such as 1,2-butylene oxide, styrene oxide;

N-vinylpyrrolidone, N-vinylcaprolactam, N-vinylformamide;

vinylaromatic compounds such as styrene, $\alpha$-methylstyrene, chlorostyrene, and compounds with two or more crosslinkable groups such as diesters of diols (including polyethylene glycols) with acrylic or methacrylic acid or divinylbenzene.

Examples of preferred polymerizable solvents are 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate and tetraethylene glycol dimethacrylate. A particularly preferred polymerizable solvent is styrene. The amount of solvent units in the polymer influences the pitch of the cholesteric helix and thus the color effect of the polymers according to the invention. The copolyisocyanates are preferably mixed with a polymerizable solvent in the ratio of about 0.8:1 to 1.4:1, in particular about 1:1 to 1.2:1, by weight. In general, a lyotropic cholesteric solution is formed from the polymer and solvent within a few hours at room temperature.

The polymers according to the invention are prepared by thermal or, preferably, photochemical crosslinking of the lyotropic cholesteric solution. The crosslinking can also be effected by electron beams.

Suitable photoinitiators for the photochemical crosslinking are all commercial photoinitiators such as isobutyl benzoin ether, 2,4,6-trimethylbenzoyldiphenylphosphine oxide, 1-hydroxycyclohexyl phenyl ketone, 2-benzyl-2-dimethylamino-1-(4-morpholinophenyl)-1-furanone, mixtures of benzophenone and 1-hydroxycyclohexyl phenyl ketone, 2,2-dimethoxy-2-phenylacetophenone, perfluorinated diphenyltitanocenes, 2-methyl-1-(4-[methylthio]-phenyl)-2-(4-morpholinyl)-1-propanone, 2-hydroxy-2-methyl-1-phenyl-1-propanone, 4-(2-hydroxyethoxy)phenyl 2-hydroxy-2-propyl ketone, 2,2-diethoxyacetophenone, 4-benzoyl-4'-methyldiphenyl sulfide ethyl 4-(dimethylamino)benzoate, mixtures of 2-isopropylthioxanthone and 4-isopropylthioxanthone, 2-(dimethylamino)ethyl benzoate, d,l-camphorquinone, ethyl-d,l-camphorquinone, mixtures of benzophenone and 4-methylbenzophenone, benzophenone, 4,4'-bisdimethylaminbenzophenone [sic], ($\eta^5$-cyclopentadienyl) ($\eta^6$-isopropylphenyl)iron(II) hexafluorophosphate, triphenylsulfonium hexafluorophosphate or mixtures of triphenylsulfonium salts, and butanediol diacrylate, dipropylene glycol diacrylate, hexanediol diacrylate, 4-(1,1-dimethylethyl)-cyclohexyl acrylate, trimethylolpropane triacrylate and tripropylene glycol diacrylate.

It is also possible where appropriate to admix other additives to the solution to be crosslinked. Suitable examples thereof are dyes, pigments, especially black pigments, polymeric binders and flow control agents.

The concentration of the additives depends on the nature of the addition and varies within the concentration ranges normally used industrially.

The polymers according to the invention preferably comprise networks, ie. the two polymers (copolyisocyanate and polystyrene) are crosslinked together by covalent bonds. This makes inhomogeneity of the two polymers impossible, even over lengthy periods.

It is furthermore beneficial that the temperature dependence of the cholesteric LC phase makes "fine adjustment" of the hue possible and easy before the crosslinking.

The present invention furthermore relates to pigments which comprise polymers according to the invention. The pigments according to the invention can be prepared, for example, by applying the copolyisocyanates according to the invention in a polymerizable solvent to a substrate, polymerizing by electron beams or in the presence of a photoinitiator by light, detaching the layer from the substrate and comminuting it to pigment particles. An advantageous substrate for this purpose is a sheet or the surface of a roll. The layer advantageously has a thickness in the range from 2 to 100 µm, particularly preferably 5 to 10 µm. Application can take place by various techniques such as painting, spraying, dipping, printing, rolling or casting, for example through an orifice. The cholesteric order state is generally set up spontaneously. It is sometimes advantageous for additional forces to act, for example by use of a knife or application of electric or magnetic fields. The detached layer is generally comminuted by grinding in a manner known to the skilled worker until the particle size is such that the average diameter is larger than the thickness of the layer, so that flake-like pigment particles result. These flake-like pigments settle, for example when used in surface coatings, on the surface of the substrates, so that a preferential direction of orientation develops in accordance with the original direction of coating. This results in the required color effect.

The copolyisocyanates according to the invention can be used as constituents of optical components or as surface-coating material. You [sic] can additionally be used as coloring agents, in particular as coloring constituent of systems for coating surfaces or as constituent of printing inks.

The present invention furthermore relates to coating compositions, in particular surface coatings, which comprise copolyisocyanates according to the invention or pigments according to the invention.

The coating compositions according to the invention are suitable in principle for coating articles of daily use for which a particularly impressive color effect is required. Particularly effective coating is obtained on vehicles such as automobiles, motor cycles and pedal cycles, packaging and labels, and articles of jewellery.

The following examples illustrate the invention without, however, restricting it thereto.

EXAMPLE 1

Terpolymer of 2,6-dimethylheptyl isocyanate (DMHIC), 2-isocyanatoethyl methacrylate (2IEMA) and n-hexyl isocyanate (HIC)

a) Preparation of the monomers a.1) (R)-(+)-2,6-Dimethylheptyl isocyanate (DMHIC)

a.1.1) (R)-(+)-Citronellic acid 44.3 g of HCl gas (measured by determining the weight gain) were passed into 187.2 g (1.045 mol) of technical (85% pure) (R)-pulegone (or R-(+)-p-menth-4(8)-en-3-one) while cooling in ice. After the reaction solution had stood overnight, it was poured into 2.0 l of 5% strength KOH solution and stirred at RT (=room temperature) for 2 h. It was subsequently extracted 5 times with 200 ml of diethyl ether each time. The extract contains pulegone and isopulegone, which can be reused. On addition of concentrated HCl to the aqueous phase (to pH=2), the citronellic acid separated out as a yellowish oil. The acid was extracted by shaking 5 times with 200 ml of diethyl ether each time, the organic phase was dried with $Na_2SO_4$ and, after the solvent had been stripped off, was distilled under reduced pressure (boiling point 105°–110° C. under 0.04 mbar). 84.6 g (0.486 mol=45.5% of theory) and, on reuse of the extracted ketones under similar conditions conditions [sic], a further 44.4 g (0.255 mol) of (R)-(+)-citronellic acid were obtained as a clear liquid.

Yield: 129.0 g (0.741 mol=71% of theory)

a.1.2) (R)-(+)-Dihydrocitronellic acid 84.5 g (0.486 mol) of (R)-(+)-citronellic acid were dissolved in 400 ml of methanol, and 4.26 g of palladium/active carbon (10%) were added. The apparatus was flushed with nitrogen, and a hydrogenation balloon filled with hydrogen was attached. After stirring at RT for 5 h, the catalyst was removed by filtration and the solvent by distillation. The resulting methyl (R)-(+)-citronellate was hydrolyzed by refluxing the crude product with 260 ml of 10% strength NaOH solution for 2 h. The mixture was then adjusted to pH 2 with concentrated HCl and extracted by shaking 4 times with 250 ml of diethyl ether, and the ether phase was dried with $Na_2SO_4$ and, after the solvent had been stripped off, distilled under reduced pressure (boiling point 98° C. under 0.3 mbar).

Yield: 79.1 g (0.451 mol=93% of theory)

a.1.3) (R)-(+)-Dihydrocitronelloyl chloride 15.0 g (87.07 mmol) of (R)-(+)-dihydrocitronellic acid were stirred with 27.63 g (218 mmol) of oxaly [sic] chloride at RT with exclusion of moisture. A few drops of DMF were added to catalyze the reaction. The reaction was completed by refluxing for 1 h. The reaction was followed by IR spectroscopy (decrease in the intensity of the band at 1700 $cm^{-1}$ for the C=O stretching vibration of the acid). Excess oxalyl chloride was distilled off (boiling point 62°–65° C.) and the product was fractionated under reduced pressure (boiling point 122°–125° C. under 50 mbar).

Yield: 15.1 g (79.1 mmol=90.9% of theory)

a.1.4) (R)-(+)-2,6-Dimethylheptyl isocyanate 11.9 g (103 mmol) of trimethylsilyl azide were added with exclusion of moisture to 15.1 g (79.1 mmol) of (R)-(+)-dihydrocitronelloyl chloride in 15 ml of absolute toluene. The reaction mixture was heated to 75° C. and, after 30 min, it was evident from the diminishing evolution of gas that the reaction was complete. For completion, it was refluxed for 30 min. Subsequently, the volatile components were stripped off under slightly reduced pressure. The crude product was dried over $CaH_2$ and distilled under reduced pressure (boiling point 111°–114° C. under 30 mbar).

Yield: 12.2 g (72.1 mmol=91.2% of theory)

a.2) n-Hexyl isocyanate (HIC)

63.6 g (0.98 mol) of sodium azide were dissolved in 195 ml of distilled water and cooled to 5° C. A solution of 100 g (0.65 mol) of heptanoyl chloride in 220 ml of absolute acetone was cautiously added dropwise to this solution, keeping the temperature at 5°–10° C. (ice bath). To complete the reaction, the mixture was stirred at 9°–13° C. for 2 h. The solution was cooled to about 1° C. and extracted 3 times with 80 ml of heptane each time. The organic phases were combined and stirred with phosphorus pentoxide for 1 hour to dry. After filtration, the solution was slowly added dropwise to heptane stirring at 90° C. After the dropwise addition was complete, the reaction was completed by refluxing for 2 hours. The reaction mixture was concentrated to 130 ml and dried with calcium hydride overnight. After the remaining heptane had been stripped off, the hexyl isocyanate was distilled under reduced pressure (boiling point 35° C. under 2 mbar).

Yield: 71.3 g (0.56 mol=86% of theory).

a.3) 2-Isocyanatoethyl methacrylate (2IEMA) commercially obtainable from Polyscience Inc. or from Showa Denko.

b) Preparation of the catalyst (cyclopentadienyldimethylamidotitanium dichloride)

b.1) Cyclopentadienyltitanium trichloride (CpTiCl$_3$)

200 ml of dry and degassed toluene were added to 21.1 g (85 mmol) of titanocene dichloride (Cp$_2$TiCl$_2$) in a dry, oxygen-free nitrogen atomsphere. The suspension was then cooled to 0° C. with stirring. 27 ml (46.8 g or 246 mmol) of titanium tetrachloride (TiCl$_4$) were added with the aid of a needle under argon. Subsequent refluxing for 6 h resulted in the Cp$_2$TiCl$_2$ dissolving and forming a deep red solution. Orange crystals formed after the solution had stood without stirring in the cold overnight. The supernatant solution was removed with a needle, and remaining volatile impurities were removed from the crude product under reduced pressure. The residue comprised 32.4 g (69% of theory) of crude product. Sublimation at 95° C. under 0.013 mbar afforded 28.8 g of CpTiCl$_3$ (61.4% of theory).

b.2) Cyclopentadienyldimethylamidotitanium dichloride (CpTiCl$_2$N(CH$_3$)$_2$)

6.25 g (28.5 mmol) of CpTiCl$_3$ were dissolved in 45 ml of absolute and degassed THF. On addition of 3.34 g (28.5 mmol) of (CH$_3$)$_3$SiN(CH$_3$)$_2$ the solution immediately became deep red. The solution was stirred at room temperature for 24 h. The THF and the other volatile impurities were stripped off under reduced pressure. The residue comprised 6.1 g (93% of theory) of crude product, which sublimed at 90° C. under 0.01 mbar and afforded 5.98 g (92% of theory) of orange CpTiCl$_2$N(CH$_3$)$_2$ crystals.

c) Terpolymer from the isocyanates 161 mg (=1.05 mmol) of DMHIC, 109 mg (=0.70 mmol) of 2IEMA and 668 mg (=5.25 mmol) of HIC were mixed and stirred in a dry, oxygen-free nitrogen atmosphere. A syringe was used to inject 263 μl (0.0875 mmol) of a volumetric solution of the catalyst in chloroform (0.2 mol/l). After only a few hours, the mixture solidified to a gel. After 3 days, the polymerization was stopped by dissolving in absolute chloroform and precipitating in ice-cold methanol. The precipitated polymer was filtered off with suction and, after briefly drying in air, reprecipitated from chloroform and methanol.

EXAMPLE 2

Preparation of a polymer according to the invention a) Preparation of the lyotropic solution 60.2mg of the terpolymer were mixed with 54 mg of styrene (freshly distilled) in a screw-cap bottle. Within about 2 hours the viscous, two-phase composition became a lyotropic solution with a blue-green shimmer at room temperature.

b) Preparation of the cholesteric network

In order to crosslink the lyotropic, cholesteric liquid crystal prepared in 2 a), about 0.2 mg of the free-radical photoinitiator ethyl 2,4,6-trimethylbenzoylphenylphosphinate (=2.0% by weight) was added to the lyotropic solution. Thin films were prepared by knife application of the solution mixed with photoinitiator. After the iridescent selective reflection occurred, the film was irradiated with UV light of wavelength 365 nm for about 3 min. The resulting film showed permanently fixed selective reflection and was permanently hard and tack-free.

What is claimed as new and desired to be secured by Letters Patent of the United States is:

1. A cholesteric copolyisocyanate with repeating units of the formulae:

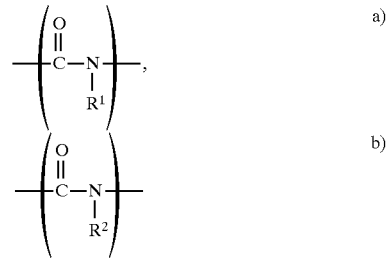

and, where appropriate, of the formula

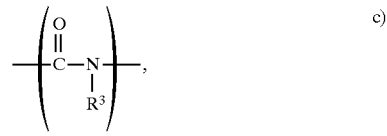

where

R$^1$ is a chiral aliphatic or aromatic radical,

R$^2$ is a crosslinkable radical, and

R$^3$ is an achiral radical.

2. The copolyisocyanate as claimed in claim 1, where R$^1$ is selected from chiral branched or unbranched alkyl, alkoxyalkyl, alkylthioalkyl, cycloalkyl, alkylphenyl or C$_3$–C$_9$-epoxyalkyl radicals or radicals from esters of C$_1$–C$_6$-fatty acids with C$_1$–C$_6$-alkanols or C$_3$–C$_9$-dialkyl ketones, where R$^1$ can have 1, 2 or 3 substituents which are identical or different and are selected from alkoxy groups, di-C$_1$–C$_4$-alkylamino groups, CN, halogen atoms or C$_1$–C$_4$-alkylthio groups.

3. The copolyisocyanate as claimed in claim 1, where the main chain of the radical R$^1$ has a length of from 3 to 12 carbons.

4. The copolyisocyanate as claimed in claim 1, where R$^1$ is selected from the group consisting of

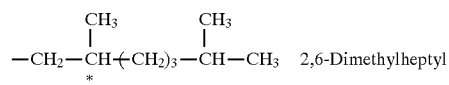

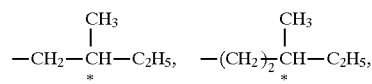

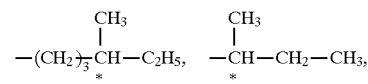

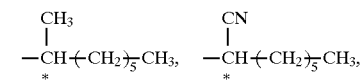

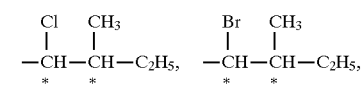

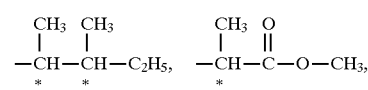

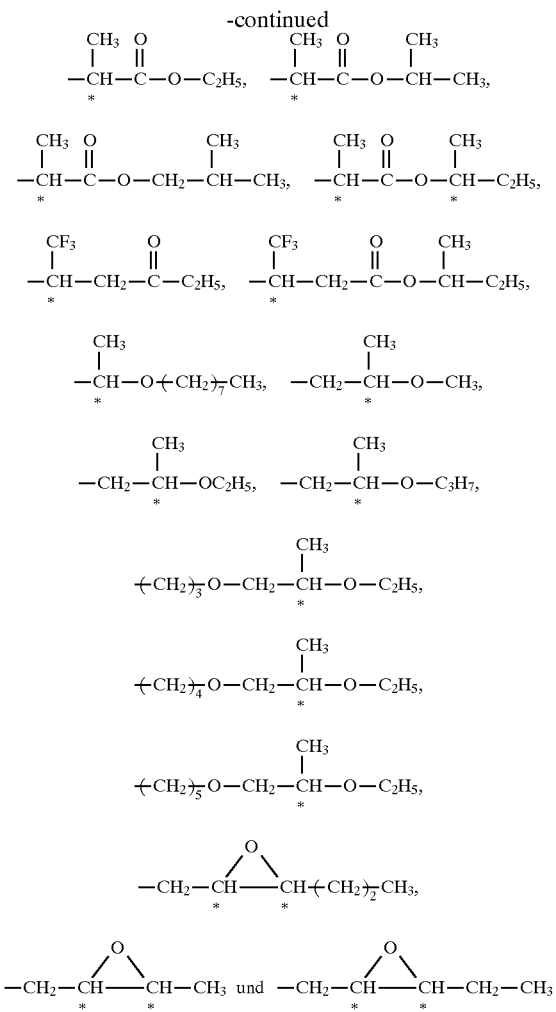

5. The copolyisocyanate as claimed in claim 1, where $R^1$ is 2,6-dimethylheptyl.

6. The copolyisocyanate as claimed in claim 1, where $R^2$ is selected from the group consisting of $C_3$–$C_{11}$-alkenyl radicals, $C_4$–$C_{11}$-vinyl ether residues, ethylenically unsaturated $C_3$–$C_{11}$-carboxylic acid residues and esters of ethylenically unsaturated $C_3$–$C_6$-monocarboxylic acids with $C_2$–$C_6$-alkanols, wherein bonding to the nitrogen atom takes place via the alkanol residue of the ester.

7. The copolyisocyanate as claimed in claim 1, where $R^2$ is selected from the group consisting of residues of methyl acrylate, ethyl acrylate, propyl acrylate, n-butyl acrylate, isobutyl acrylate, 2-ethylhexyl acrylate, methyl methacrylate, ethyl methacrylate, propyl methacrylate, n-butyl methacrylate, isobutyl methacrylate, 2-ethylhexyl methacrylate, ethyl acrylate and ethyl methacrylate.

8. The copolyisocyanate as claimed in claim 1, where $R^3$ is selected from the group consisting of branched or unbranched alkyl, alkoxyalkyl, alkylthioalkyl, $C_3$–$C_9$- epoxyalkyl, cycloalkyl, alkylaryl radicals and radicals from esters of $C_1$–$C_6$-fatty acids with $C_1$–$C_6$-alkanols and $C_3$–$C_9$-dialkyl ketones, where $R^3$ optionally has 1, 2 or 3 substituents which are identical or different, and are selected from the group consisting of alkoxy groups, dialkylamino groups, CN, halogen atoms and $C_1$–$C_4$-alkylthio groups.

9. The copolyisocyanate as claimed in claim 1, where the main chain of the radical $R^3$ has a length of from 4 to 12 carbons.

10. The copolyisocyanate as claimed in claim 1, where $R^3$ is n-hexyl, n-heptyl or n-octyl.

11. The copolyisocyanate as claimed in claim 1, where components a), b) and c) are present in the a:b:c ratio of molar amounts of about 1–20:1–20:50–98.

12. A cholesteric polymer obtained by
  i) dissolving copolyisocyanates as claimed in any of the preceding claims in a polymerizable solvent, and
  ii) crosslinking the copolyisocyanates and solvent together.

13. The polymer as claimed in claim 12, wherein the polymerizable solvent is selected from esters of $\alpha,\beta$-unsaturated $C_3$–$C_6$-mono- or dicarboxylic acids with $C_1$–$C_{12}$-alkanols, vinyl ethers, vinyl esters, epoxides, N-vinylpyrrolidone, N-vinylcaprolactam, vinylaromatic compounds, and compounds containing two or more crosslinkable groups.

14. The polymer as claimed in claim 12, wherein styrene is employed as polymerizable solvent.

15. A pigment, comprising polymers as claimed in claim 12.

16. The copolyisocyanate as claimed in claim 11, where components a), b) and c) are present in the a:b:c: ratio of molar amounts of about 5–15:5–15:65–90.

17. The copolyisocyanate as claimed in claim 11, where components a), b) and c) are present in the a:b:c: ratio of molar amounts of about 15:10:75.

18. A coating composition, comprising copolyisocyanates as claimed in claim 1 or pigments as claimed in claim 15.

19. A process for preparing copolyisocyanates as claimed in claim 1, which comprises polymerizing the monomers underlying components a), b) and optionally, c) in the presence of a catalyst of the formula $CpTiCl_2OCH_2CF_3$, $CpTiCl_2CH_3$ or $CpTiCl_2N(CH_3)_2$, where Cp is $\eta^5$-cyclopentadienyl.

20. The copolyisocyanate as claimed in claim 3, where the main chain of the radical $R^1$ has a length of from 6 to 10 carbons.

21. The copolyisocyanate as claimed in claim 20, where the main chain of the radical $R^1$ has a length of from 6 to 8 carbons.

22. The copolyisocyanate as claimed in claim 9, where the main chain of the radical $R^3$ has a length of from 6 to 8 carbons.

23. The copolyisocyanate as claimed in claim 22, where the main chain of the radical $R^3$ has a length of from 6 to 8 carbons.

* * * * *